(12) United States Patent
Clark

(10) Patent No.: US 8,559,568 B1
(45) Date of Patent: Oct. 15, 2013

(54) SLIDING DFT WINDOWING TECHNIQUES FOR MONOTONICALLY DECREASING SPECTRAL LEAKAGE

(71) Applicant: Brian Clark, San Jose, CA (US)

(72) Inventor: Brian Clark, San Jose, CA (US)

(73) Assignee: Audience, Inc., Mountain View, CA (US)

( * ) Notice: Subject to any disclaimer, the term of this patent is extended or adjusted under 35 U.S.C. 154(b) by 0 days.

(21) Appl. No.: 13/722,272

(22) Filed: Dec. 20, 2012

Related U.S. Application Data

(60) Provisional application No. 61/583,147, filed on Jan. 4, 2012.

(51) Int. Cl.
*H04L 27/06* (2006.01)
*G06F 17/14* (2006.01)

(52) U.S. Cl.
USPC .......................................... 375/340; 708/405

(58) Field of Classification Search
USPC .................... 375/219, 316, 340; 708/403–405
See application file for complete search history.

(56) References Cited

U.S. PATENT DOCUMENTS

| 6,104,822 A * | 8/2000 | Melanson et al. ............ 381/320 |
| 7,020,218 B2 * | 3/2006 | Arnesen ........................ 375/316 |
| 2011/0044408 A1 * | 2/2011 | Ahmad .......................... 375/340 |

* cited by examiner

*Primary Examiner* — David B. Lugo
(74) *Attorney, Agent, or Firm* — Carr & Ferrell LLP

(57) ABSTRACT

Provided are methods and systems for digital signal processing by applying an improved SDFT technique for eliminating ripple in side lobes of a resulting spectrum. An exemplary method may comprise receiving an input signal which includes a number of discrete samples taken at regular time intervals. The input signal may then be filtered by a modified comb filter according to the sliding DFT technique to generate first and second filtered signals, the second filtered signal being filtered using a different filter coefficient. The first and second filtered signals may be processed by a first and second plurality of resonators respectively, according to the sliding DFT technique, to generate respective first and second SDFT output signals. The first and second SDFT output signals may then be selectively summed to generate a resulting output signal.

20 Claims, 11 Drawing Sheets

SLIDING DFT WINDOWING TECHNIQUES FOR MONOTONICALLY DECREASING SPECTRAL LEAKAGE

CROSS REFERENCE TO RELATED APPLICATIONS

This non-provisional patent application claims the benefit of U.S. provisional patent application No. 61/583,147, filed on Jan. 4, 2012, which is hereby incorporated by reference in its entirety.

TECHNICAL FIELD

The application generally relates to digital signal processing and, more specifically, to improvements of Sliding Discrete Fourier Transform techniques for signal processing.

BACKGROUND

The Fourier transform is a mathematical technique for representation of various functions as sums of simpler trigonometric functions, or vice versa. Today, the Fourier transform is utilized in a vast number of applications such as signal processing, signal filtering, signal feature extraction, and signal analysis. The Fourier transform finds its applications in audio and video signal processing, wireless telecommunications, stream data processing, encrypting, coding, decoding, and so forth.

The Discrete Fourier Transform (DFT) is a specific kind of discrete transform that may be used to transform one function into another and is known as a frequency domain representation of the original function (often a function in the time domain), or vice versa. The DFT requires a discrete input function. Such inputs are often created by sampling a continuous function, such as the amplitude of an audio signal or similar wave signals. The discrete input function has a finite duration, such as one or more periods or a windowed segment of a longer sequence. The DFT evaluates frequency components to reconstruct the finite segment that was analyzed. The inverse DFT cannot reproduce the entire time domain, unless the input happens to be periodic. Therefore, it is often said that the DFT is a transform for Fourier analysis of finite-domain discrete-time functions.

An input to the DFT is a finite sequence of real or complex numbers, which makes the DFT suitable for processing digital signals, and thus useful, for example, in analyzing frequencies included in a sampled signal. A key enabling factor for these applications is the fact that the DFT can be computed efficiently by using a Fast Fourier Transform (FFT) technique.

In general, the FFT technique is an efficient technique to compute the DFT and its inverse using a smaller number of iterations compared to classical Fourier Transform techniques. Typically, FFT techniques involve receiving and processing signal samples by grouping them into batches (or successive groups of samples). The starting points of any two adjacent batches may typically include several tens or even thousands of different samples. In other words, a computer performing the FFT may jump through data, taking snapshots of the data at regular intervals. The effect on the output of the computer is similar to using a strobe lamp, rather than a continuous light source, to keep track of the signal behavior.

There are many distinct FFT techniques, one of which is a Sliding Discrete Fourier Transform (SDFT). The SDFT was designed to enable detecting or extracting signal features of the FFT when the signal is at the boundary of two batches, something difficult to achieve with the conventional FFT technique. The SDFT implements a virtual sliding window which moves along the sampled signal, with the moving step as low as one sample. Accordingly, the virtual sliding window extracts batches for further DFT processing on a continuing basis. Moreover, the SDFT takes advantage of two or more successive batches which may contain substantially identical elements. The similarities between the neighboring batches are exploited in SDFT for improving computational efficiency.

Generally, the SDFT is an attractive technique for many applications because it responds to changes in signal behavior immediately and, thereby, provides minimal latency. Additionally, the SDFT may produce continuous signal updates for predictive analysis and respond correctly to transient signals. These features may be used in speech recognition, industrial control, avionics, radar, data compression, securities trading, and many other fields.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are methods and systems for signal processing by applying an improved SDFT technique. According to various embodiments of the improved SDFT technique, ripple in side lobes of resulting spectrum may be eliminated through the use of multiple comb filter outputs and the use of windowing technique for these outputs. The present methods and systems make signal feature extraction simpler and more robust.

Methods for signal processing may be implemented by one or more processors, controllers, logic elements or any other suitable computing devices. An example method may comprise receiving an input signal, with the input signal including a number of discrete samples taken at regular time intervals. The method may further comprise comb filtering the input signal according to a SDFT technique to generate a first comb filtered signal. The method may further comprise comb filtering the input signal according to the sliding DFT technique to generate a second comb filtered signal. The method may further comprise applying the first comb filtered signal to a first plurality of resonators according to the sliding DFT technique to generate a first SDFT output signal. The method may further comprise applying the second comb filtered signal to a second plurality of resonators according to the sliding DFT technique to generate a second SDFT output signal. The method may further comprise summing the first SDFT output signal and the second SDFT output signal to generate a resulting output signal.

In certain embodiments of the present disclosure, the summing of the first SDFT output signal and the second SDFT output signal may comprise applying a discrete window function. The discrete window function may refer to the Hann function. The Hann function may use windowing coefficients of "+0.25," "−0.25," "+0.5," and "−0.5". The windowing coefficients of "+0.5" and "−0.5" may be applied to a main frequency tap of the first filtered signal or the second filtered signal. The windowing coefficients of "+0.25" and "−0.25" may be applied to one or more frequency taps neighboring to the main frequency tap of the first filtered signal or the second filtered signal. The Hann function may include at least a 3-points window Hann function.

In certain embodiments of the present disclosure, the first plurality of resonators and the second plurality of resonators may comply with the sliding DFT technique. The filtering of the input signal according to the sliding DFT technique may be performed by a comb filter. The comb filter may include a delay line. The comb filter may use a feed-forward coefficient of "−1" to generate the first filtered signal and use a feed-forward coefficient of "+1" to generate the second filtered signal. The summing of the first SDFT output signal and the second SDFT output signal may generate two or more output signals.

In certain embodiments of the present disclosure, the sliding DFT technique may include a recursive sliding DFT technique. The sliding DFT technique may include a warped sliding DFT technique. The sliding DFT technique may include a multi-scale sliding DFT technique.

In certain embodiments of the present disclosure, the method may further comprise selectively combining the two or more resulting output signals. The method may further comprise determining a main frequency from the resulting output signal.

Provided also is a system for signal processing. In certain embodiments of the present disclosure, the system may comprise a communication module configured to receive an input signal, with the input signal including a number of discrete samples taken at regular intervals in time. The system may further comprise a comb filter configured to filter the input signal according to a SDFT technique to generate a first filtered signal and a second filtered signal.

The system may further comprise a first plurality of resonators configured to process the first filtered signal and generate a first SDFT output signal. The system may further comprise a second plurality of resonators configured to process the second filtered signal and generate a second SDFT output signal. The system may further comprise a summer configured to sum the first SDFT output signal and the second SDFT output signal and generate a resulting output signal.

Provided also a non-transitory processor-readable medium. The medium can have a program being executable by at least one processor to perform a method for signal processing. The method may comprise receiving an input signal with the input signal including a number of discrete samples taken at regular time intervals. The method may further comprise filtering the input signal according to a SDFT technique to generate a first filtered signal. The method may further comprise filtering the input signal according to the sliding DFT technique to generate a second filtered signal. The method may further comprise applying the first filtered signal to a first plurality of resonators according to the sliding DFT technique to generate a first SDFT output signal. The method may further comprise applying the second filtered signal to a second plurality of resonators according to the sliding DFT technique to generate a second SDFT output signal. The method may further comprise summing the first SDFT output signal and the second SDFT output signal to generate a resulting output signal.

Embodiments described herein may be practiced on any device that is configured to receive and/or provide audio such as, but not limited to, personal computers, tablet computers, mobile devices, cellular phones, phone handsets, headsets, media devices, and systems for teleconferencing applications.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
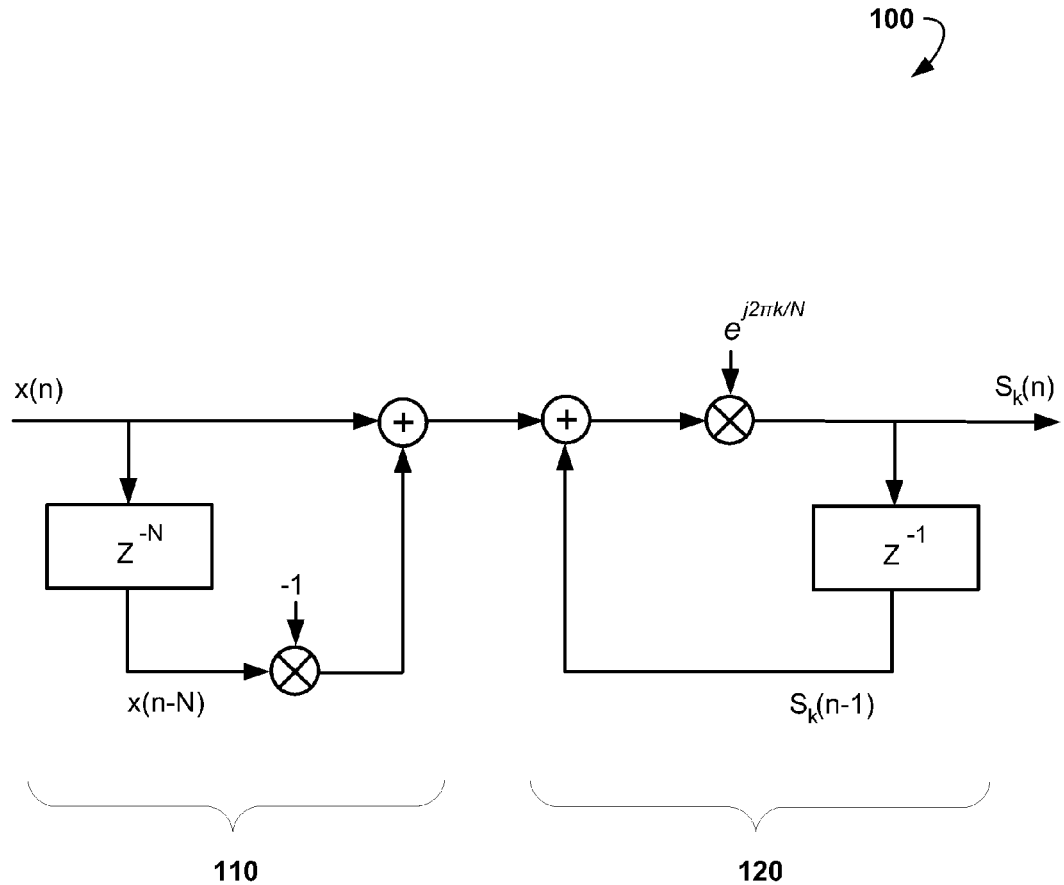
FIG. 1 shows a block diagram of an example conventional SDFT processor having a single resonator.

Various aspects of the subject matter disclosed herein are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspects may be practiced without these specific details. In other instances, well-known structures and devices are shown in block diagram form in order to facilitate describing one or more aspects.

The techniques of the embodiments disclosed herein may be implemented using a variety of technologies. For example, the methods described herein may be implemented by software executing on a computer system or by hardware utilizing either a combination of processors or other specially designed application-specific integrated circuits, programmable logic devices, or various combinations thereof. In particular, the methods described herein may be implemented in a series of processor-executable instructions residing on a storage medium such as a disk drive or a processor-readable medium.

Figure 2:
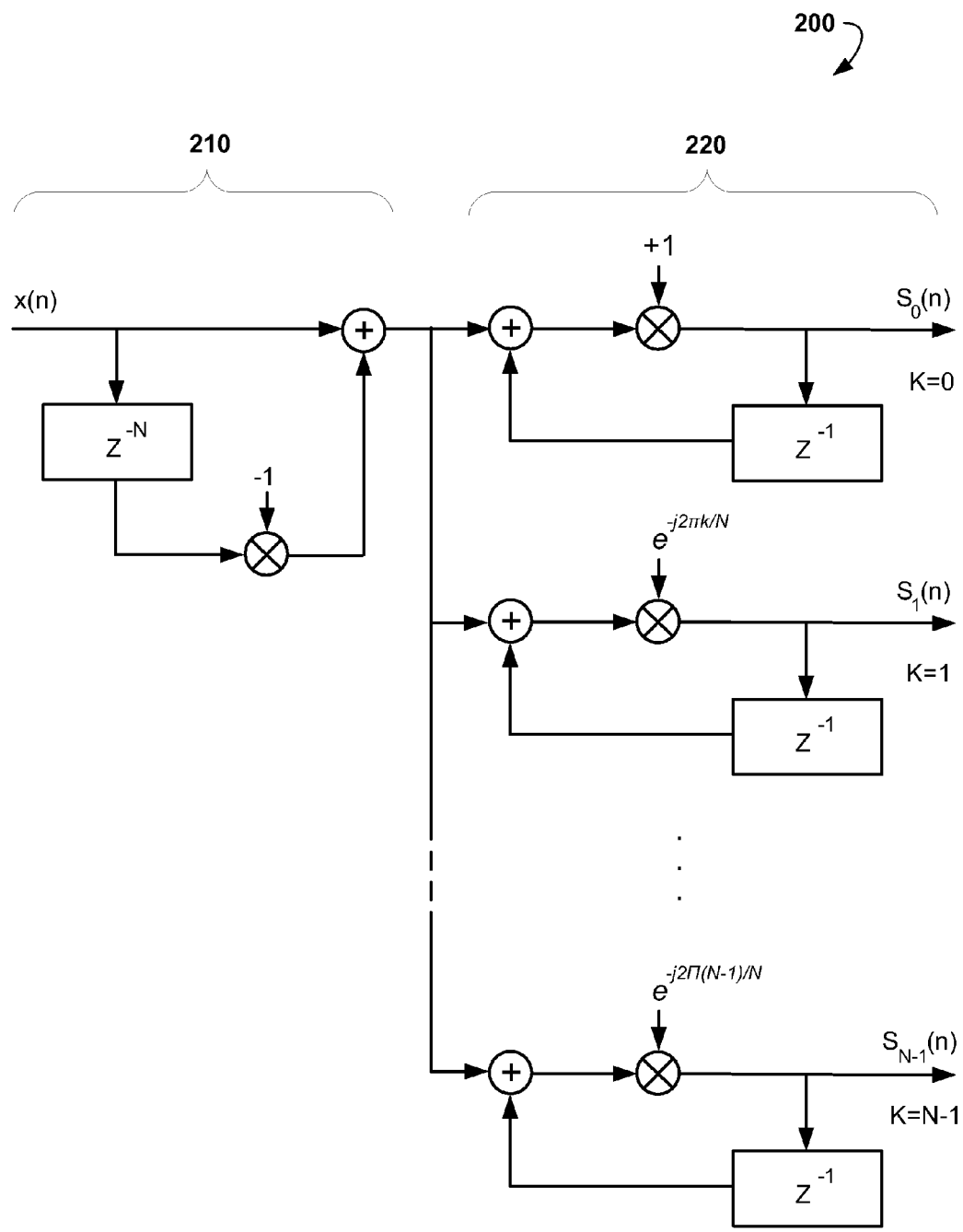
FIG. 2 shows a block diagram of another example conventional SDFT processor having a plurality of resonators.

Conventionally, SDFT techniques may be implemented by a SDFT processor shown in FIG. 1. Specifically, FIG. 1 shows a block diagram of a conventional SDFT processor 100 having a comb filter 110 (also known as a feed-forward comb filter) and a resonator 120. The SDFT processor 100 may be used to extract a specific signal feature. In particular, it may be designed to detect and emphasize a specific signal frequency or a frequency range. In various applications, SDFT processors may be also configured to extract multiple features. In such cases, SDFT processors may include a plurality of resonators. FIG. 2 shows a block diagram of another example of a conventional SDFT processor 200 having a comb filter 210 and a plurality 220 of resonators designed to extract two or more signal features.

Figure 3:
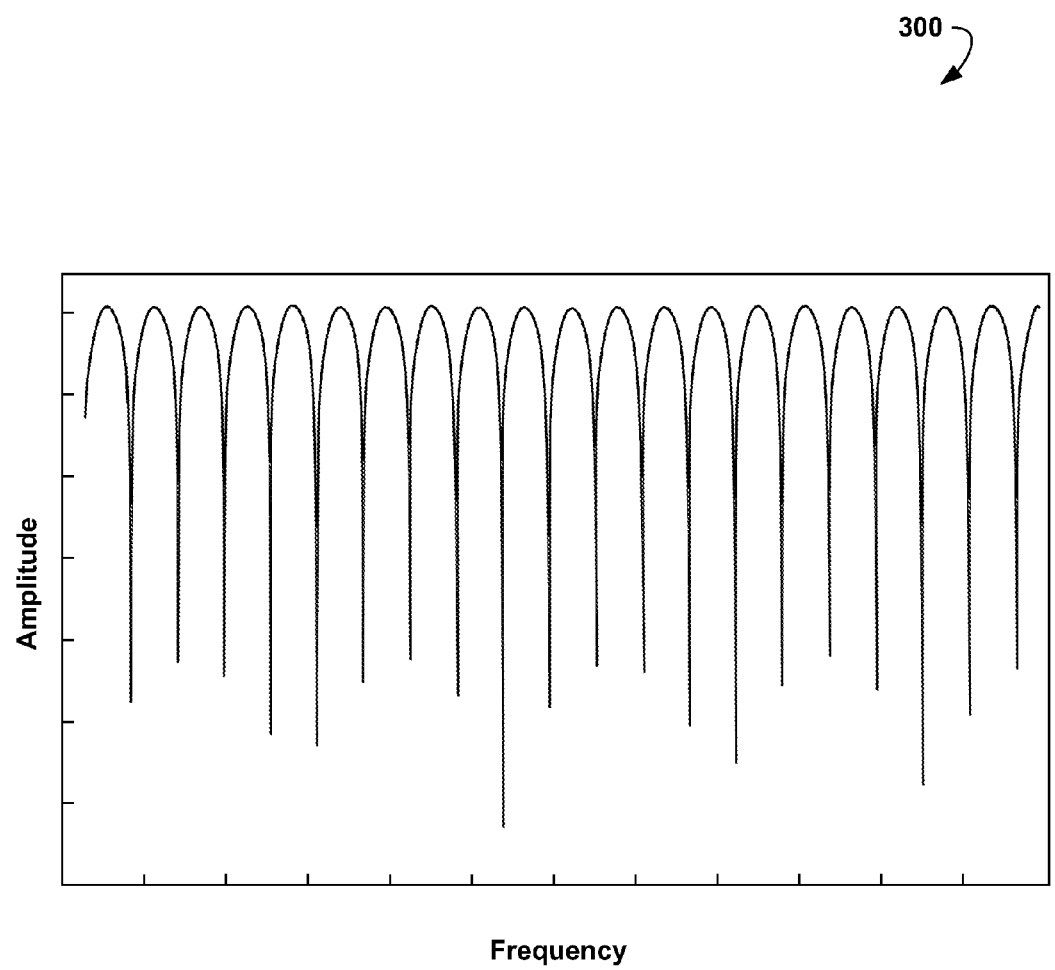
FIG. 3 shows an example frequency spectrum as output by a classical comb filter of a conventional SDFT processor.

In operation, the comb filters 110 and 210 may accept input signal (i.e., accepts signals samples at the signal sampling rate) and simultaneously generates a delayed version of the input signal causing constructive and destructive interference. Typically, the frequency response of the comb filters 110 and 210 consists of a series of regularly spaced spikes, giving thereby the appearance of a "comb". FIG. 3 shows an example frequency spectrum 300 as an output by the comb filters 110 and 210.

Figure 4:
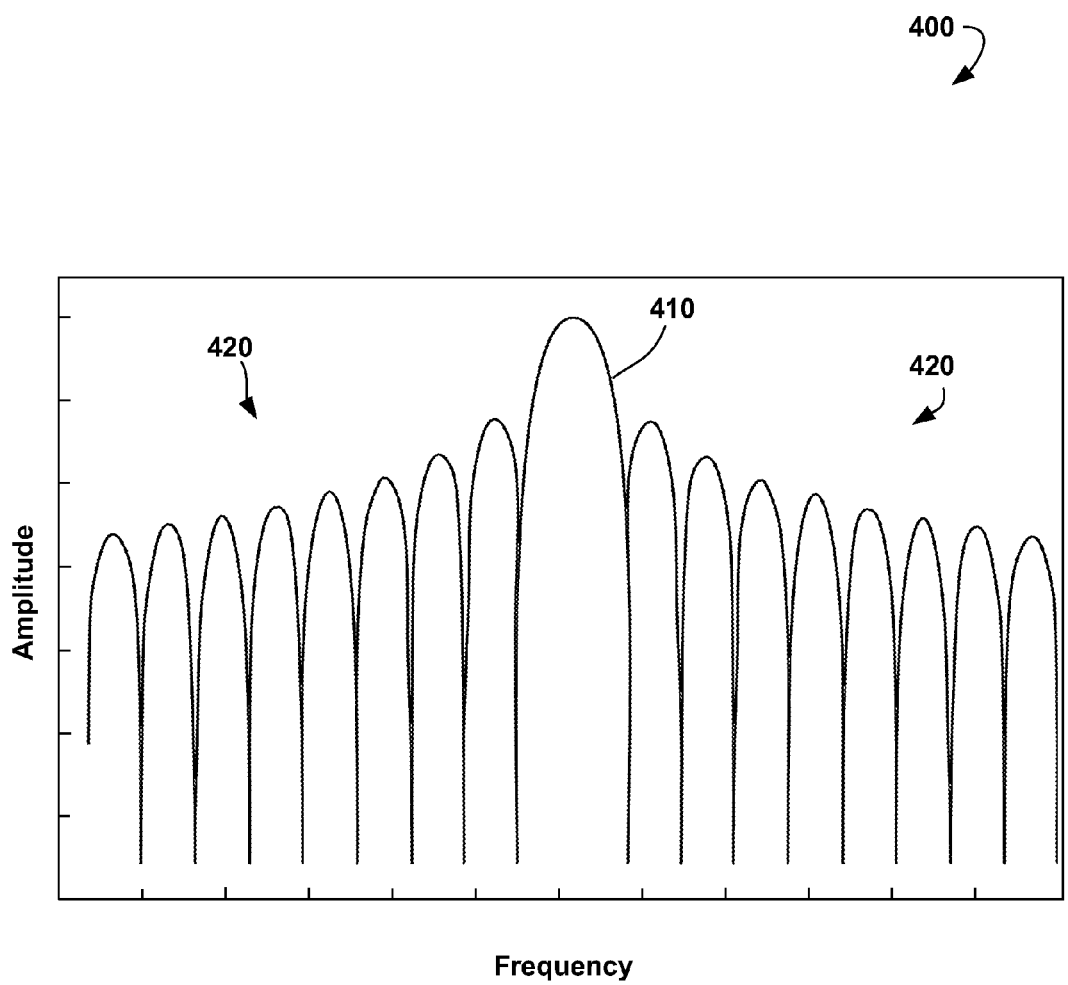
FIG. 4 shows an example frequency spectrum as an output by the classical resonator of a conventional SDFT processor.

The resonator 120 may emphasize a specific feature of the output signal of the comb filter 110. Thus, while the comb filter 110 is generating a series of notches in the input signal, the resonator 120 may selectively cancel them to create frequency taps. FIG. 4 shows an example frequency spectrum 400 as an output of the resonator 120 or one of the resonators from the plurality 220 of resonators. As shown in FIG. 4, there are a main lobe 410 and a plurality of side lobes 420. The main lobe 410 is typically a lobe of interest, while the side lobes 420 may be considered unwanted "byproducts".

The side lobes 420 are a result of non-cancellation of notches presented in the comb filter output by the resonators. The presence of the side lobes 420 can make it difficult or sometimes even impossible to identify peaks, such as the main lobe 410, or other features in the spectrum 400. This drawback may often prevent using SDFT for digital signal processing.

In general, the techniques of the embodiments disclosed herein refer to the improvements of the SDFT directed to better digital signal processing. More specifically, the present techniques effectively eliminate notches in side lobes 420 as shown in FIG. 4, making it easier to identify and extract features in the spectrum output from SDFT processors. According to one or more embodiments described herein, this result can be achieved by re-designing a comb filter and applying an additional windowing technique to the output of resonators. Both of these improvements are discussed below in greater detail.

Figure 5:
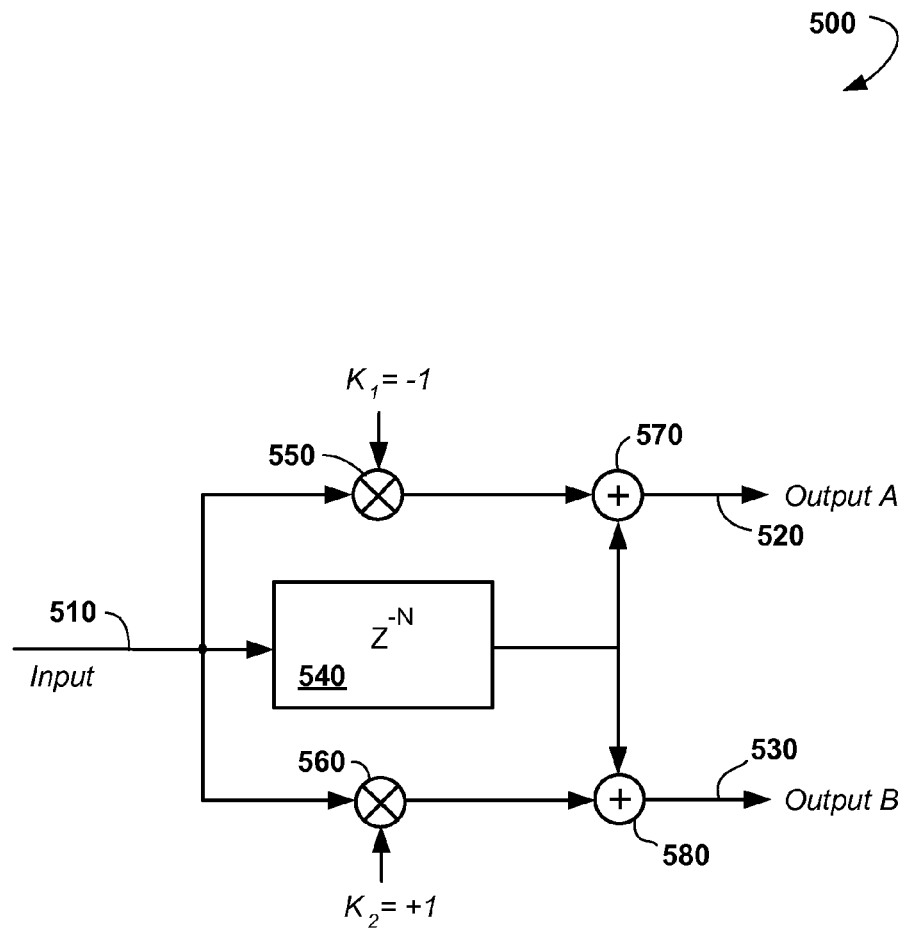
FIG. 5 shows a block diagram of a comb filter, according to one or more embodiments of the present disclosure.

FIG. 5 shows a block diagram of a comb filter 500 according to one or more embodiments of the present disclosure. The comb filter 500 includes an input line 510 and two output lines 520 and 530. Additionally, there is a delaying unit 540 which may perform a Z-transformation. The Z-transformation, generally speaking, converts a discrete time-domain signal, which can be represented as a sequence of real or complex numbers, into a complex frequency-domain representation. According to one or more embodiments of the present disclosure, the Z-transformation may be delayed by a delaying factor N.

The comb filter 500 may include a first scaling unit 550 and, optionally, a second scaling unit 560. The first scaling unit 550 and second scaling unit 560 may apply feed-forward coefficients K1 and K2 to signals fed thereinto, accordingly. In an example embodiment, the feed-forward coefficient K1 may be "4", while the feed-forward coefficient K2 may be of "+1". It should be clear for those skilled in the art that any other feed-forward coefficients may be used.

The comb filter 500 may further include a first summer 570 and a second summer 580, which generate an output signal "A" and an output signal "B", correspondingly. As shown in FIG. 5, in operation, the input signal may be fed into the delaying unit 540, the first scaling unit 550 and the second scaling unit 560. Furthermore, the transformed and delayed signal may be output from the delaying unit 540 and delivered to the first summer 570 and the second summer 580. Thus, the first summer 570 sums the input signal as scaled by the first scaling unit 550 using the feed-forward coefficient K1 and the output from the delaying unit 540 to generate the output signal "A". Similarly, the second summer 580 may sum the input signal as scaled by the second scaling unit 560 using the feed-forward coefficient K2 and output from the delaying unit 540 to generate the output signal "B".

Thus, when K1=−1 and K2=+1, the comb filter 500 may generate two respective output signals "A" and "B". According to various embodiments, comparing the comb filter 500 using a feedforward coefficient of −1 to the comb filter 500 using a feedforward coefficient of +1, the zeros of the +1 comb filter will be rotated counter-clockwise around the unit circle by an angle of pi/N radians, where N is the number of delayed samples in the delay path. Those skilled in the art will appreciate that there can be two classical comb filters to achieve the same purpose in some embodiments, whereas each classical comb filters may need to use the feed-forward coefficients K1 and K2, respectively.

Figure 6:
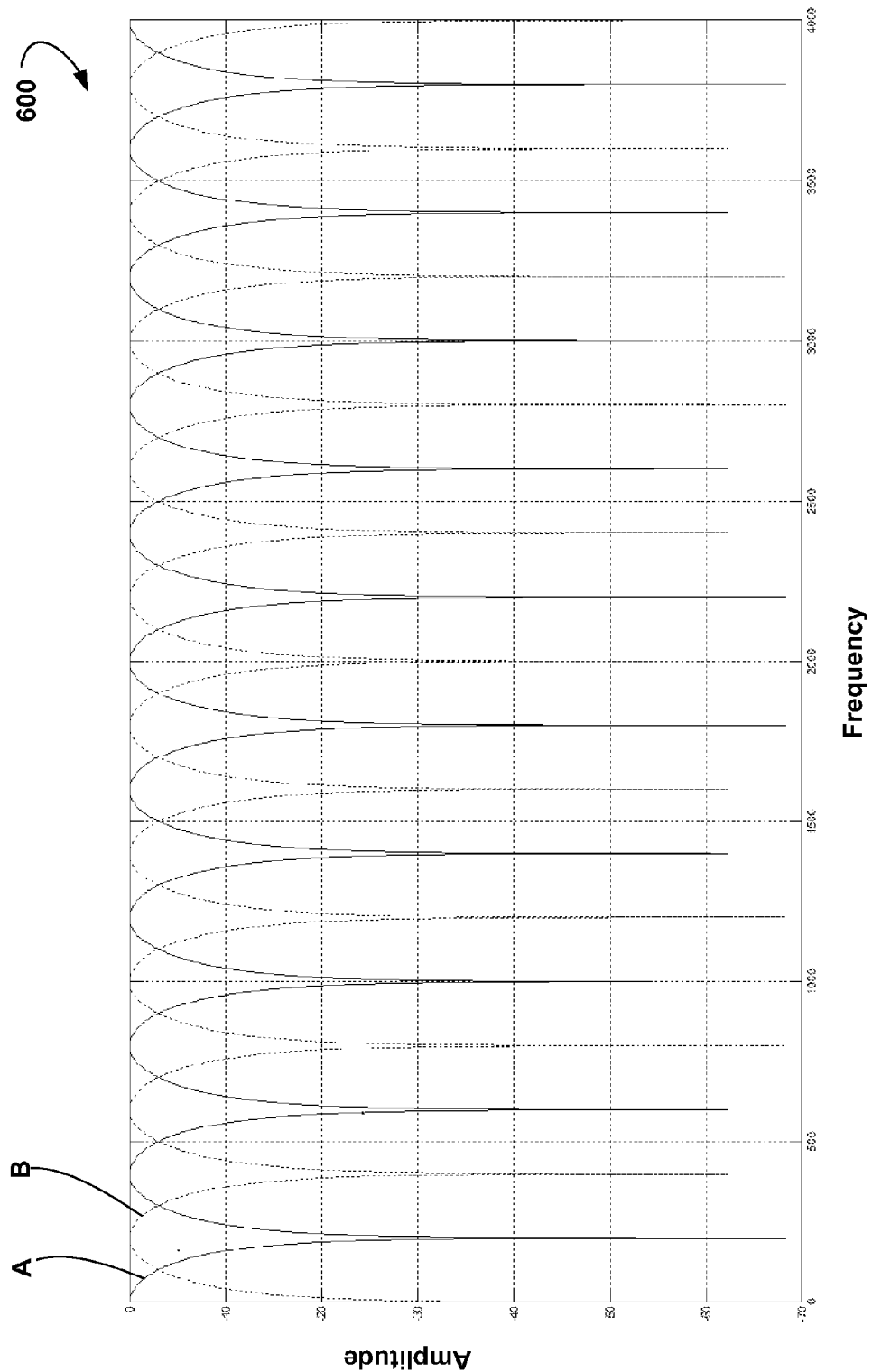
FIG. 6 shows an example frequency spectrum as an output from a comb filter, according to one or more embodiments of the present disclosure.

FIG. 6 shows an example frequency spectrum 600 as an output from the comb filter 500. As shown in this figure, the frequency spectrum 600 may include two output signals "A" and "B", different due to the reasons described above. Each of these output signals "A" and "B" can then be processed via two separate plurality of resonators which will effectively multiply the number of frequency taps for a given comb filter delay.

Figure 7:
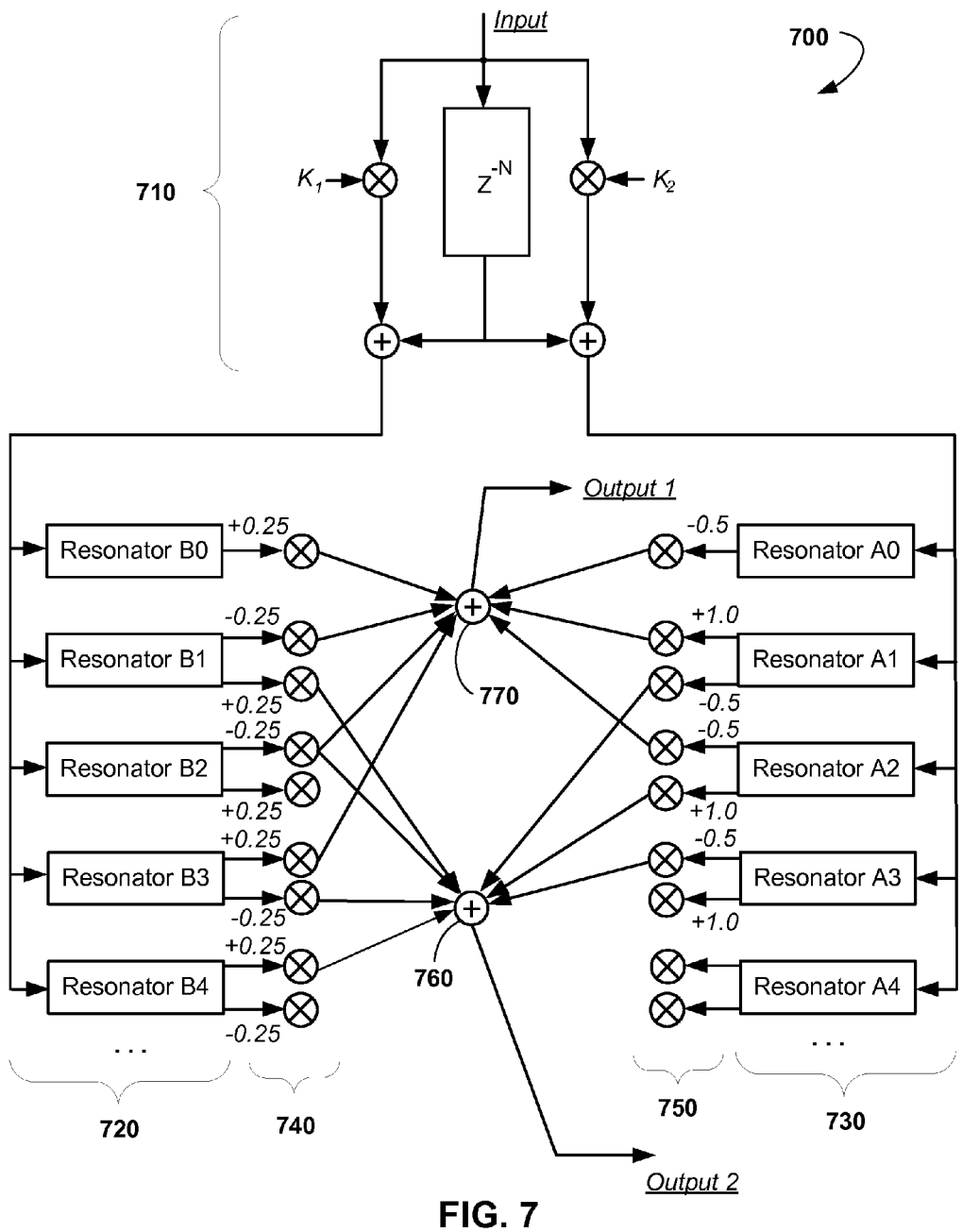
FIG. 7 shows a SDFT processor, according to one or more embodiments of the present disclosure.

FIG. 7 shows a SDFT processor 700 configured to perform an improved SDFT technique according to one or more embodiments of the present disclosure. The SDFT processor 700 includes a comb filter 710, which may replicate the comb filter 500 shown in FIG. 5. The SDFT processor 700 may further include a first plurality 720 of resonators and a second plurality 730 of resonators, each of which may be operatively coupled with corresponding output of the comb filter 710. There may also be a first plurality of multipliers 740 and a second plurality of multipliers 750 which may be coupled to the output of the resonators of the first and second pluralities 720 and 730 of resonators. The first and second pluralities of multipliers 740 and 750 may be correspondingly attached to summers 760 and 770, which in turn may generate final outputs 2 and 1, respectively in FIG. 7. It should be recognized by those skilled in the art that a number of resonators in the pluralities 720 and 730 may vary depending on a particular application (e.g., a number of signal features to be extracted or analyzed). The same is true for the multipliers 740, and 750 and the summers 760 and 770; their numbers may vary depending on a particular application and needs.

As shown in FIG. 7, the outputs of resonators may be selectively multiplied by a corresponding factor (for example, −0.5, −0.25, +0.25, +0.5, +1.0) and then selectively summed together to generate one or more final output signals. The multiplication by such factors enables utilization of a "windowing technique" which may be considered a strobe function. In other words, the windowing technique (also known as a window function, an apodization function or a tapering function) may refer to a mathematical function that is zero-valued outside of some predetermined interval. A basic example of this function is a rectangular window, when a function is constant within a certain interval and zero elsewhere. Another example of the windowing technique is the Hann (or Hanning) function, which may be used for spectrum aliasing with the purpose of emphasizing of the main lobe. For example, according to the Hann function for a single output case of the comb filter 710, ½ of the main frequency tap and ¼ of each of the two neighboring frequency taps (as shown in the figure) may utilized. Otherwise, any other suitable windowing technique can be applied by selectively adapting the factors of the multipliers 740 and 750.

The SDFT processor 700 may thereby perform an improved SDFT technique, in which the spectral leakage is monotonically decreased. In other words, the SDFT processor 700 may eliminate ripple of side lobes and effectively emphasize the main lobe for further successful detection, feature extraction, or any other analysis or modification.

Figure 8:
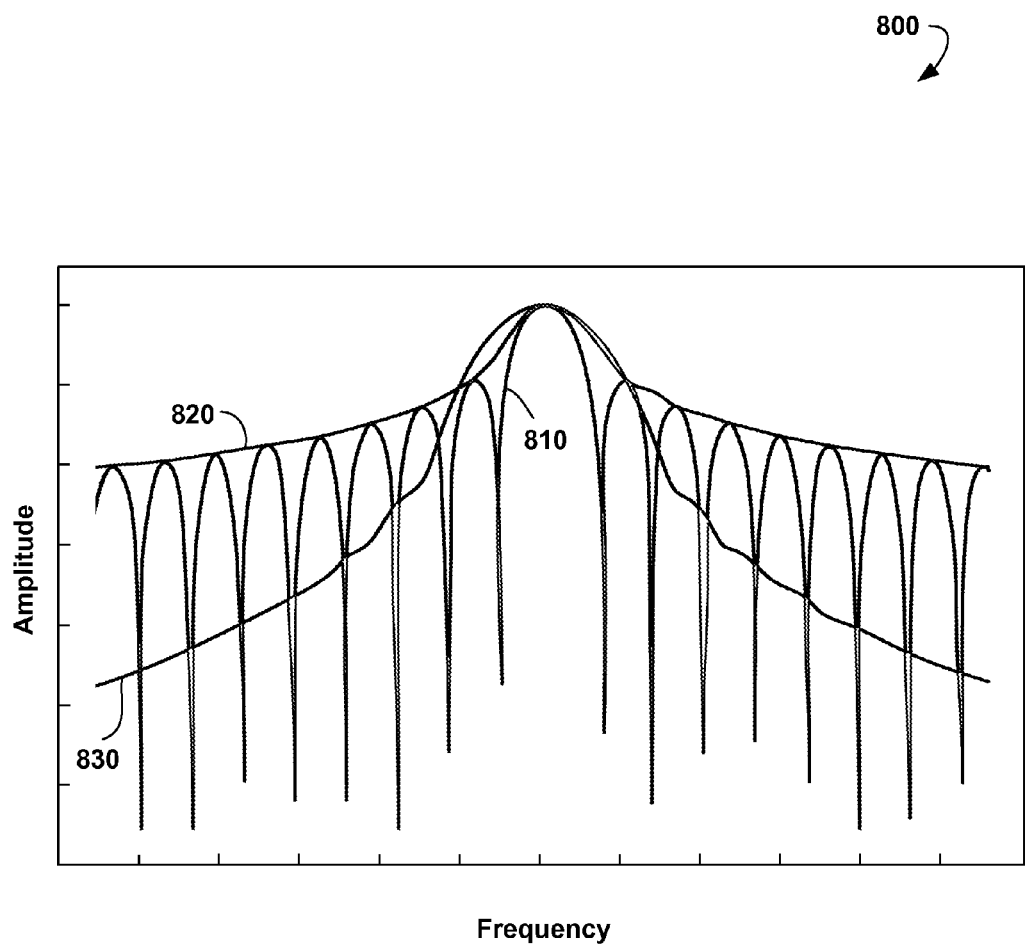
FIG. 8 shows example resulting frequency spectrums as output from a conventional SDFT processor and from the improved SDFT processor, according to one or more embodiments of the present disclosure.

FIG. 8 shows example frequency spectrums 800 as an output from a traditional SDFT processor and from the improved SDFT processor 700 as described herein. More specifically, a spectrum 810 may refer to an output spectrum generated by a conventional SDFT processor 100 or 200. A spectrum 820 refers to an output spectrum generated by a certain embodiment of the SDFT processor 700 using 3-points Hann function. Similarly, a spectrum 830 refers to an output spectrum generated by another embodiment of the SDFT processor 700 using 7-points Hann function.

Therefore, as shown in FIG. 7, the present technology may effectively eliminate the ripple in the side lobes of the resulting spectrum making feature extraction simpler and more robust. It should be also mentioned that the present technology can be used in conjunction with improved SDFT techniques such as Warped SDFT, Recursive SDFT or Multi-Scale SDFT.

Figure 9:
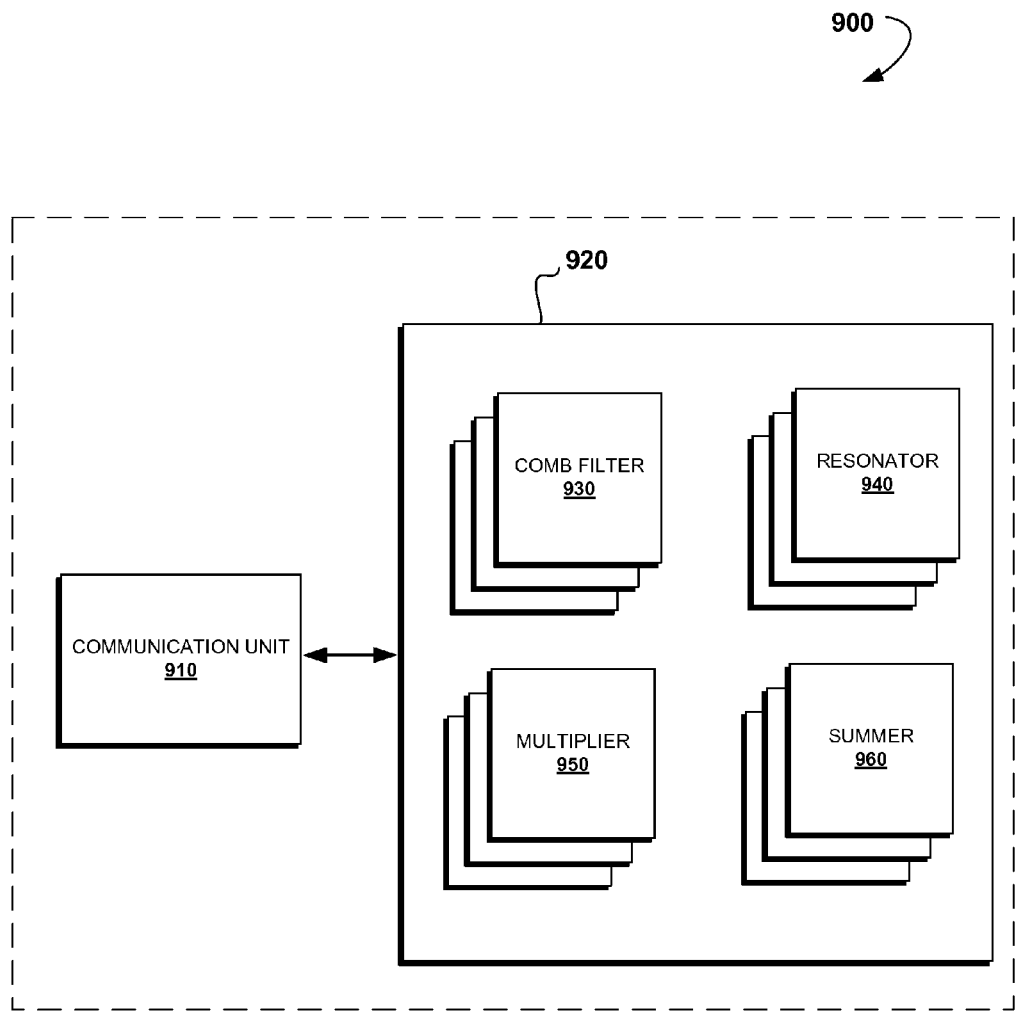
FIG. 9 shows a high-level block diagram of a system environment suitable for implementing methods for digital signal processing via certain improved SDFT techniques.

FIG. 9 shows a general block diagram of system environment 900 suitable for implementing methods for digital signal processing via certain improved SDFT techniques. The system environment 900 may comprise a communication unit 910 for receiving an input signal such as a stream of discrete samples taken at regular intervals in time and for transmitting resulting spectrums. The communication unit 910 may be operatively coupled to a SDFT processor 920, which in turn includes one or more comb filters 930, one or more resonators 940, one or more multipliers 950, and one or more summers 960. The principles of operation of these units are described above. The SDFT processor 920 may be implemented as shown in FIG. 7 or similarly, i.e. it may have various components depending on specific needs.

The system environment 900 may include a standalone computing device or be an integrated part of a larger computer, processor, or logic. It should be clear that one or more units of the system environment 900 may be implemented as hardware components, software (virtual) components, or a combination of both.

Figure 10:
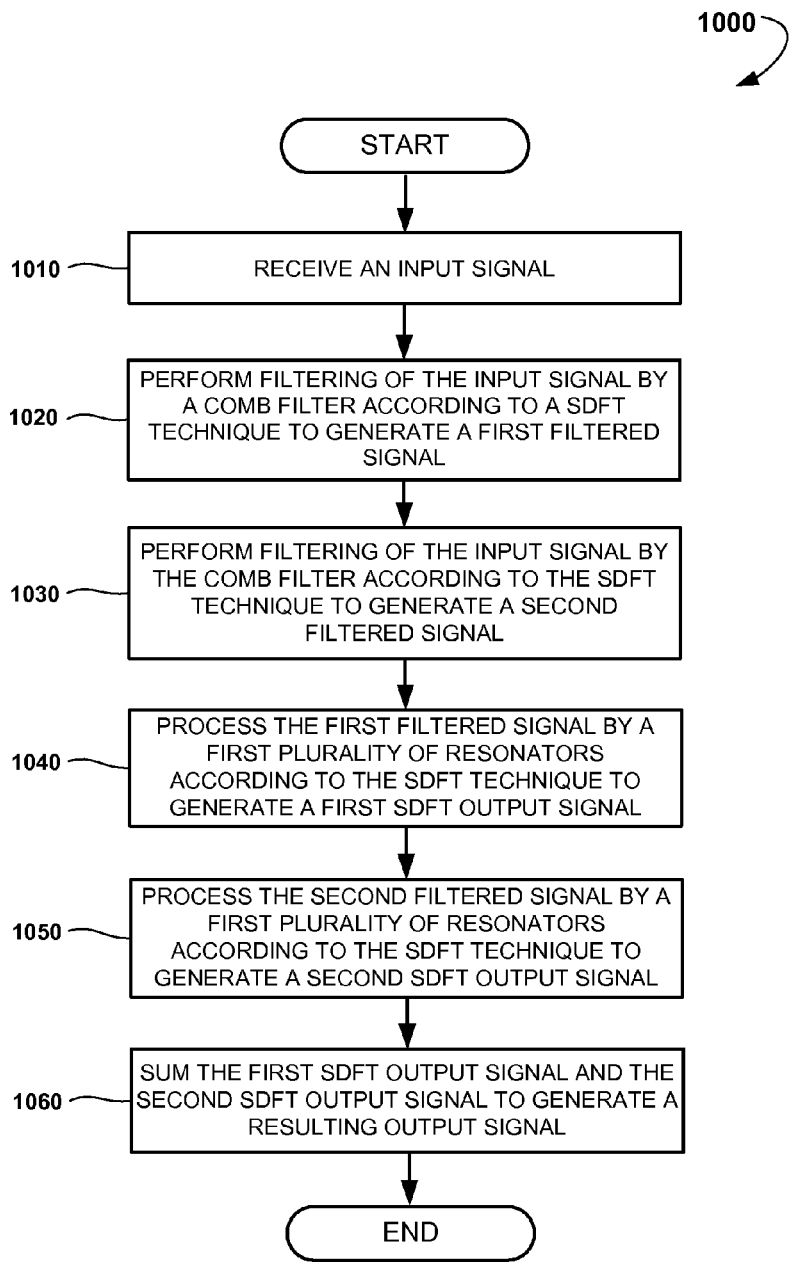
FIG. 10 is a flow chart of an example method for digital signal processing.

FIG. 10 is a flow chart of an example method 1000 for digital signal processing. The method 1000 may be performed by processing logic that may include hardware (e.g., dedicated logic, programmable logic, microcode, etc.), software (such as run on a general-purpose computer system or a dedicated machine), or a combination of both. In one example embodiment, the processing logic resides at the system environment 900.

The method 1000 may commence at operation 1010 with the communication unit 910 receiving an input signal such as a stream of discrete samples taken at regular intervals in time. At operation 1020, the comb filters 710 and 930 may filter the input signal according to a SDFT technique to generate a first filtered signal. Similarly, at operation 1030, the comb filters 710 and 930 may filter the input signal according to the SDFT technique to generate a second filtered signal.

At operation 1040, the first filtered signal may be applied to and processed by the first plurality of resonators 720 and 940 according to the sliding DFT technique to generate a first SDFT output signal. Similarly, at operation 1050, the second filtered signal may be applied to and processed by the second plurality of resonators 730 and 940 according to the sliding DFT technique to generate a second SDFT output signal.

At operation 1060, the one or more summers 760, 770, and 960 may selectively sum the first SDFT output signal and the second SDFT output signal to generate a resulting output signal. The resulting output signal may be then output by the communication unit 910 or otherwise processed or analyzed.

Figure 11:
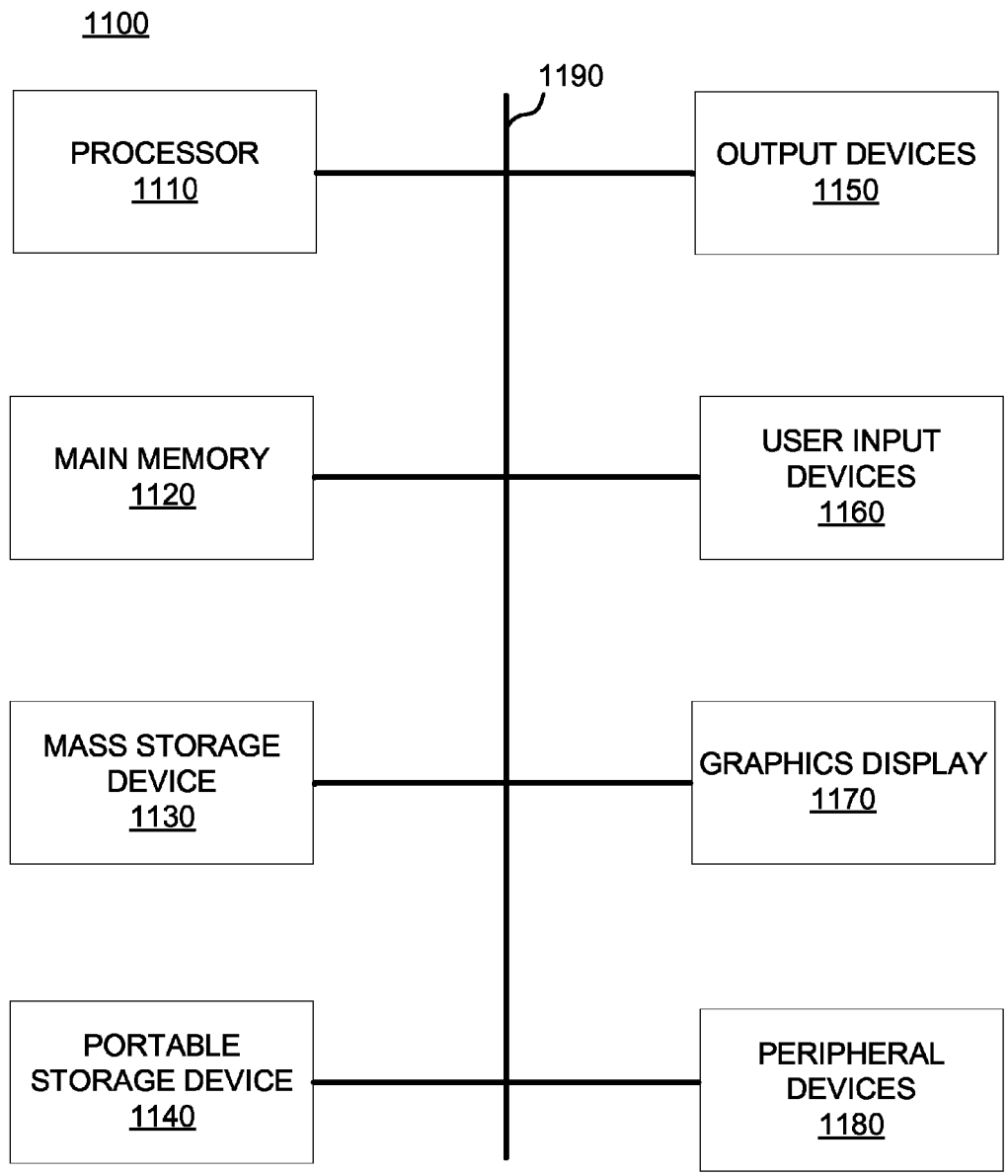
FIG. 11 shows a block diagram of an exemplary computing system that may be used to implement embodiments of the present invention.

FIG. 11 illustrates an exemplary computing system 1100, hereinafter system 1100, that may be used to implement embodiments of the present invention. The system 1100 may be implemented in the contexts of the likes of computing systems, networks, servers, or combinations thereof. The system 1100 may include one or more processors 1110 and main memory 1120. Main memory 1120 stores, in part, instructions and data for execution by processor 1110. Main memory 1120 may store the executable code when in operation. The system 1100 may further includes a mass storage device 1130, portable storage device(s) 1140, output devices 1150, user input devices 1160, a graphics display 1170, and peripheral device(s) 1180.

The components shown in FIG. 11 are depicted as being connected via a single bus 1190. The components may be connected through one or more data transport means. Processor 1110 and main memory 1120 may be connected via a local microprocessor bus, and the mass storage device 1130, peripheral device(s) 1180, portable storage device 1140, and graphics display 1170 may be connected via one or more input/output (I/O) buses.

Mass storage device 1130, which may be implemented with a magnetic disk drive or an optical disk drive, is a non-volatile storage device for storing data and instructions for use by processor 1110. Mass storage device 1130 may store the system software for implementing embodiments of the present invention for purposes of loading that software into main memory 1120.

Portable storage device 1140 operates in conjunction with a portable non-volatile storage medium, such as a floppy disk, compact disk, digital video disc, or USB storage device, to input and output data and code to and from the system. The system software for implementing embodiments of the present invention may be stored on such a portable medium and input to the system 1100 via the portable storage device 1140.

User input devices 1160 provide a portion of a user interface. User input devices 1160 may include one or more microphones, an alphanumeric keypad, such as a keyboard, for inputting alpha-numeric and other information, or a pointing device, such as a mouse, a trackball, stylus, or cursor direction keys. User input devices 1160 may also include a touchscreen. Additionally, the system 1100 as shown in FIG. 11 includes output devices 1150. Suitable output devices include speakers, printers, network interfaces, and monitors.

Graphics display 1170 may include a liquid crystal display (LCD) or other suitable display device. Graphics display 1170 receives textual and graphical information, and processes the information for output to the display device.

Peripheral devices 1180 may be included and may include any type of computer support device to add additional functionality to the computer system.

The components provided in the system 1100 are those typically found in computer systems that may be suitable for use with embodiments of the present invention and are intended to represent a broad category of such computer components that are well known in the art. Thus, the system 1100 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), Blu-ray Disc (BD), any other optical storage medium, RAM, PROM, EPROM, EEPROM, FLASH memory, and/or any other memory chip, module, or cartridge.

Thus, various methods and systems for digital signal processing using improved SDFT techniques have been described. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A computer-implemented method for digital signal processing, the method comprising:
    receiving, by a processor, an input signal, the input signal including a number of discrete samples taken at regular intervals of time;
    filtering the input signal according to a sliding Discrete Fourier Transform (DFT) technique using a filter coefficient to generate a first filtered signal;
    filtering the input signal according to the sliding DFT technique using a different filter coefficient to generate a second filtered signal;
    applying the first filtered signal to a first plurality of resonators according to the sliding DFT technique to generate a first SDFT output signal;
    applying the second filtered signal to a second plurality of resonators according to the sliding DFT technique to generate a second SDFT output signal; and
    summing the first SDFT output signal and the second SDFT output signal to generate a resulting output signal.

2. The method of claim 1, wherein the summing of the first SDFT output signal and the second SDFT output signal comprises applying a discrete window function.

3. The method of claim 2, wherein the discrete window function includes a Hann function.

4. The method of claim 3, wherein the Hann function uses windowing coefficients of ±0.25 and ±0.5.

5. The method of claim 4, wherein the windowing coefficients of +0.5 and −0.5 are applied to a main frequency tap of the first filtered signal or the second filtered signal.

6. The method of claim 5, wherein the windowing coefficients of +0.25 and −0.25 are applied to one or more frequency taps neighboring to the main frequency tap of the first filtered signal or the second filtered signal.

7. The method of claim 3, wherein the Hann function includes at least a 3-points window Hann function.

8. The method of claim 3, wherein the Hann function includes at least a 7-points window Hann function.

9. The method of claim 1, wherein the filtering of the input signal according to the sliding DFT technique to generate the first filtered signal and the second filtered signal is performed respectively by a first and second comb filter, wherein the first comb filter uses a feed-forward coefficient of −1 to generate the first filtered signal and the second comb filter uses a feed-forward coefficient of +1 to generate the second filtered signal.

10. The method of claim 1, wherein the filtering of the input signal according to the sliding DFT technique is performed by a comb filter.

11. The method of claim 10, wherein the comb filter includes a delay line shared by two outputs.

12. The method of claim 10, wherein the comb filter uses a feed-forward coefficient of −1 to generate the first filtered signal and uses a feed-forward coefficient of +1 to generate the second filtered signal.

13. The method of claim 1, wherein the summing of the first SDFT output signal and the second SDFT output signal generates two or more resulting output signals.

14. The method of claim 13, further comprising selectively combining the two or more resulting output signals.

15. The method of claim 1, wherein the sliding DFT technique includes a recursive sliding DFT technique.

16. The method of claim 1, wherein the sliding DFT technique includes a warped sliding DFT technique.

17. The method of claim 1, wherein the sliding DFT technique includes a multi-scale sliding DFT technique.

18. The method of claim 1, further comprising determining a main frequency lobe based on the resulting output signal.

19. A system for digital signal processing, the system comprising:
    a communication module configured to receive an input signal, the input signal including a number of discrete samples taken at regular intervals of time;
    a comb filter configured to filter the input signal according to a sliding DFT technique to generate a first filtered signal using a filter coefficient and to generate a second filtered signal using a different filter coefficient;
    a first plurality of resonators configured to process the first filtered signal according to the sliding DFT technique to generate a first SDFT output signal;
    a second plurality of resonators configured to process the second filtered signal according to the sliding DFT technique to generate a second SDFT output signal; and
    at least one summer configured to sum the first SDFT output signal and the second SDFT output signal to generate a resulting output signal.

20. A non-transitory processor-readable medium having embodied thereon a program being executable by at least one processor to perform a method for digital signal processing, the method comprising:
    receiving an input signal, the input signal including a number of discrete samples taken at regular intervals in time;
    filtering the input signal according to a sliding DFT technique using a first filter coefficient to generate a first filtered signal;
    filtering the input signal according to the sliding DFT technique using a different filter coefficient to generate a second filtered signal;

applying the first filtered signal to a first plurality of resonators according to the sliding DFT technique to generate a first SDFT output signal;

applying the second filtered signal to a second plurality of resonators according to the sliding DFT technique to generate a second SDFT output signal; and summing the first SDFT output signal and the second SDFT output signal to generate a resulting output signal.

\* \* \* \* \*